No. 851,957. PATENTED APR. 30, 1907.
E. D. PACKARD.
WATER PURIFYING APPARATUS.
APPLICATION FILED JUNE 22, 1906.
3 SHEETS—SHEET 1.
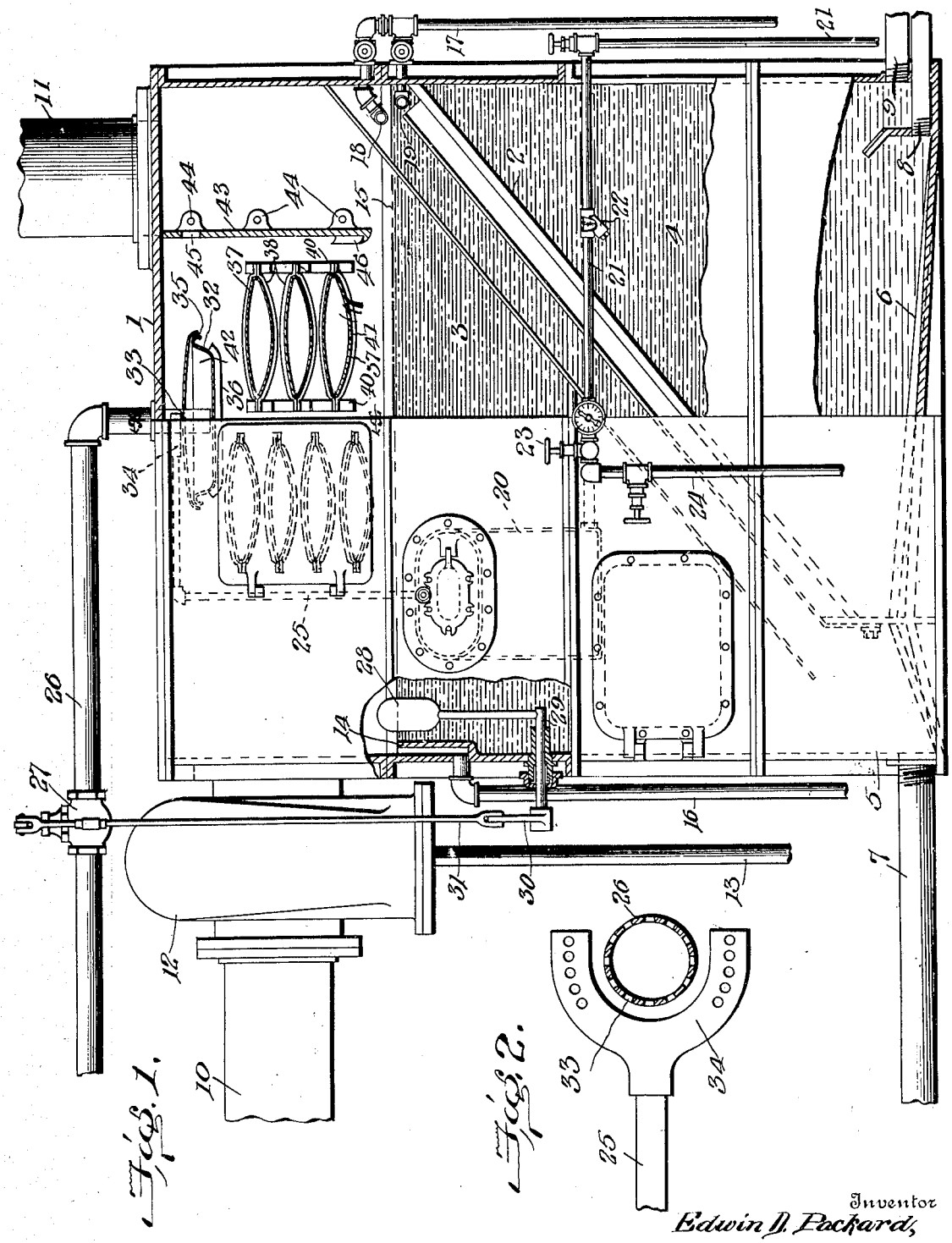
Witnesses
G. Howard Walmsley,
C. L. Cammaker.
Inventor
Edwin D. Packard,
By H. A. Toulmin,
Attorney

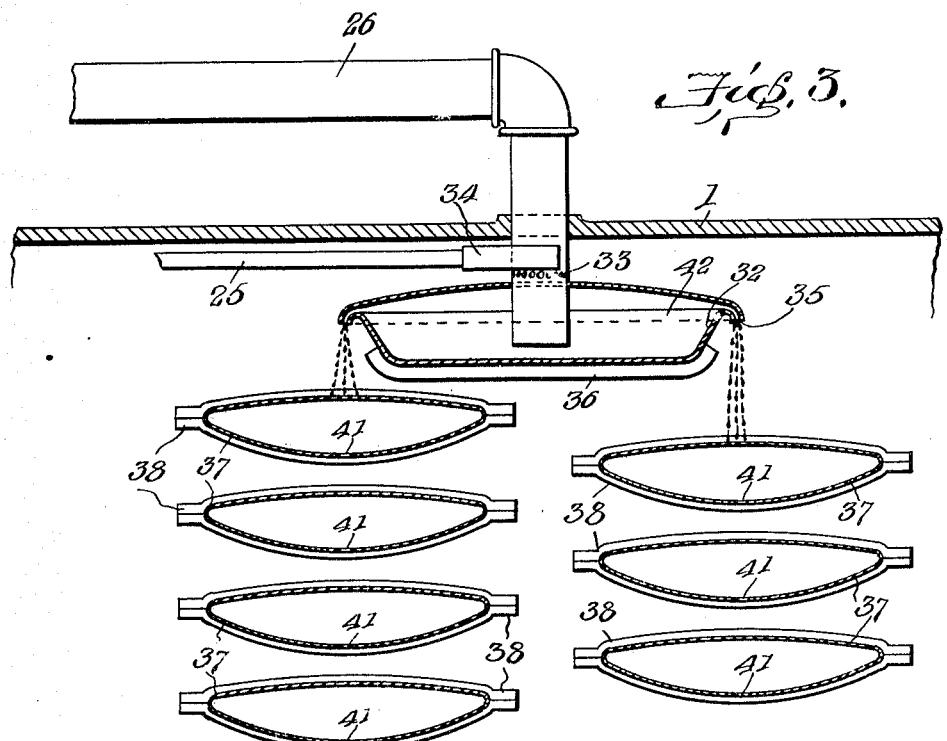
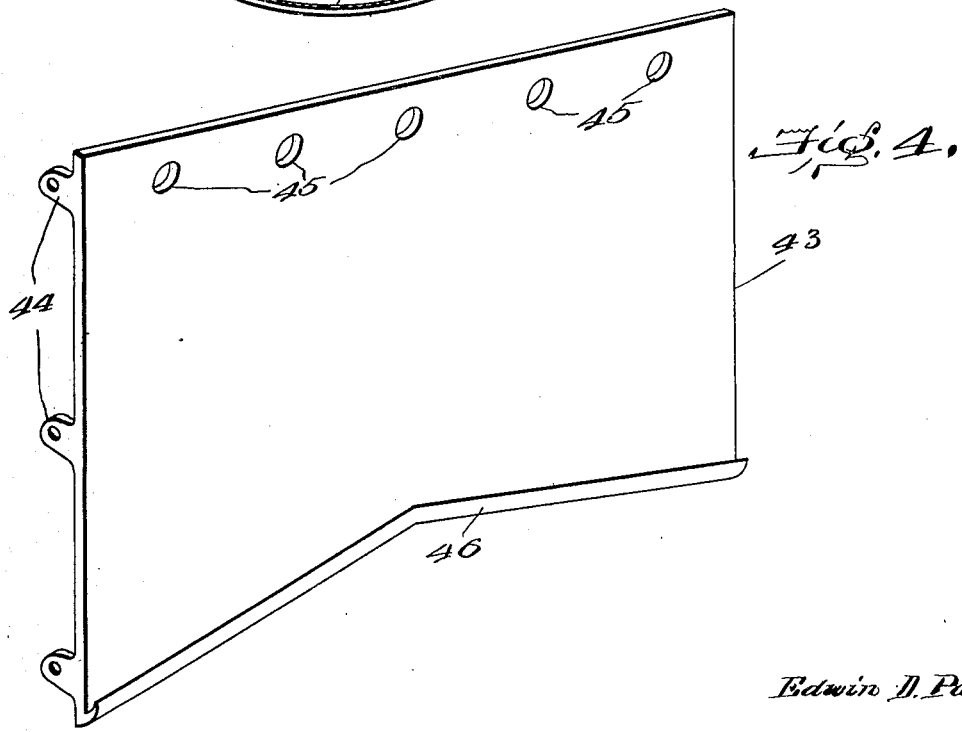

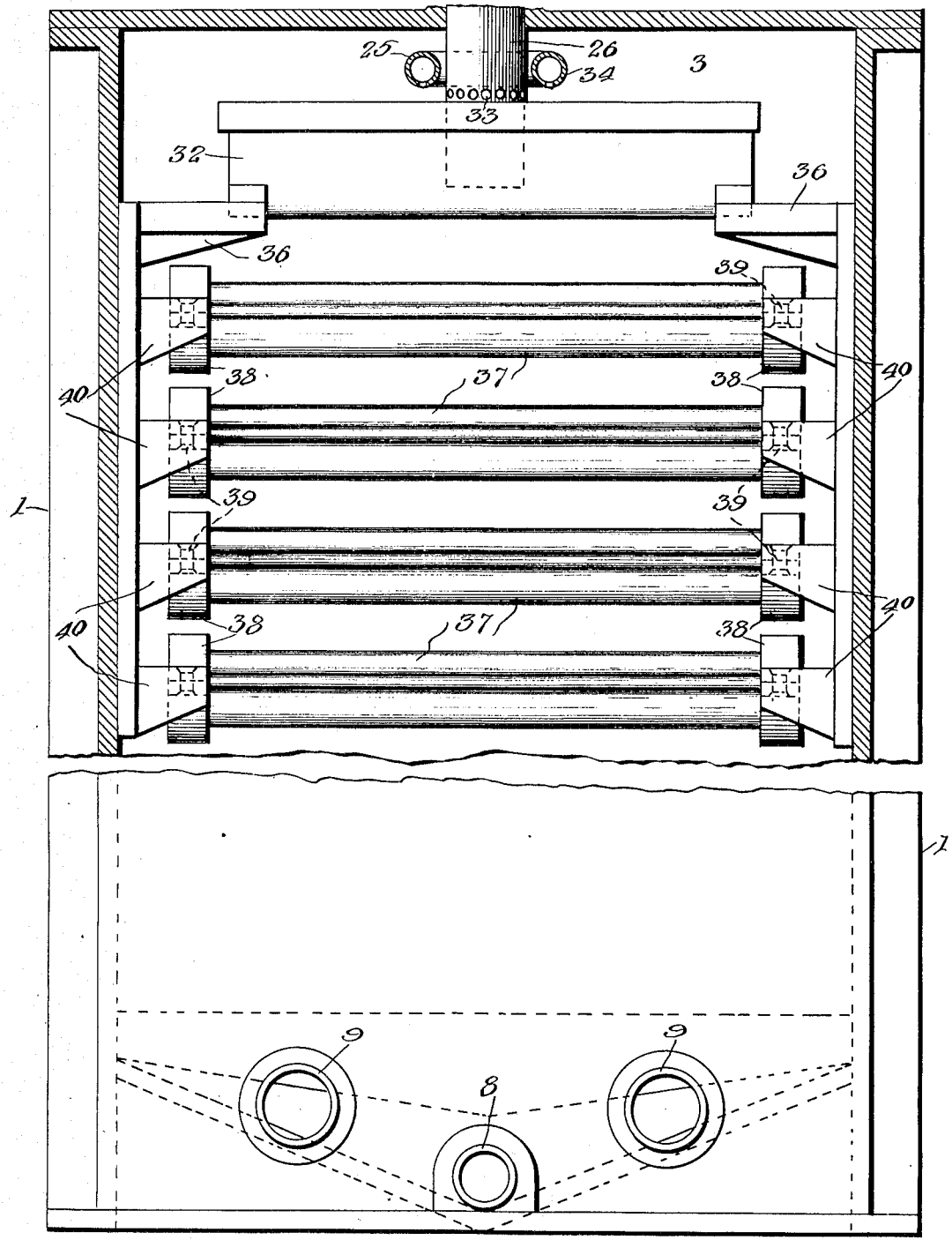

UNITED STATES PATENT OFFICE.

EDWIN D. PACKARD, OF MARION, OHIO, ASSIGNOR, BY DIRECT AND MESNE ASSIGNMENTS, TO THE MARION INCLINE FILTER AND HEATER COMPANY, OF MARION, OHIO, A CORPORATION OF OHIO.

WATER-PURIFYING APPARATUS.

No. 851,957.      Specification of Letters Patent.      Patented April 30, 1907.

Application filed June 22, 1906. Serial No. 322,898.

*To all whom it may concern:*

Be it known that I, EDWIN D. PACKARD, a citizen of the United States, residing at Marion, in the county of Marion and State of Ohio, have invented certain new and useful Improvements in Water-Purifying Apparatus, of which the following is a specification, reference being had therein to the accompanying drawings.

This invention relates to improvements in water purifying apparatus for use in heating and purifying feed water for steam boilers.

The essential object of my invention is to provide an improved type of water tray or pan for distributing the water into thin sheets, to permit heating it and precipitating the lime and other impurities therein. By my construction of trays or pans the water is more perfectly distributed, more readily heated, and hence its impurities more thoroughly precipitated, while at the same time the nature of my trays or pans is such that but little lime or impurities adhere to them, and this little they will free themselves of by an automatic contraction and expansion of the walls of the trays or pans, thus cracking up and shedding off any lime or other impurities temporarily adhering thereto. These and some subordinate objects and features constitute my invention.

In the accompanying drawings, Figure 1 is a side elevation of the water heater and purifier containing my improvements, and shown partially in section to facilitate illustration; Fig. 2, an enlarged detail view, partly in inverted plan and partly in section, of the feed water pipe and the chemical solution pipe; Fig. 3, a sectional view, on a larger scale, of my trays or pans and adjacent parts; Fig. 4, a detail perspective view of the baffle plate; and Fig. 5, a partial end elevation and sectional view of the apparatus, the sectional portion being taken on the line $x$ $x$ of Fig. 1, looking in the direction of the arrows and showing the trays or pans in side elevation.

The numeral 1 designates the casing of any approved form of water heater and purifier, but preferably, so far as concerns the filter bed, which is placed on an incline, as shown at 2, of the type embodied in Letters Patent issued to O. L. Stump Jan. 23, 1906, No. 810,441, for feed water heaters. The upper part of the apparatus, designated at 3, receives the unfiltered water and the lower part or portion 4 receives the filtered water, which has also been purified by the treatment of heat in section 3 before it is filtered in the filter bed 2. Other usual features of the apparatus are the sediment or impurities collection chamber 5 and the pure water bottom 6, having, respectively, wash out pipes 7 and 8; the pure water supply pipes 9, which leads to the boiler pump, by which the water is pumped into the boiler against boiler pressure; an exhaust steam inlet 10 and outlet 11, an oil separator 12, with its drain pipe 13, a skimmer composed of the wall 14 and the adjacent wall of the casing, the skimmer being on a line with the usual water level in the apparatus, indicated by the broken line 15, and a drain pipe 16 for the skimmer to carry off the floating impurities which enter the skimmer proper.

Other usual features of the appartaus with which I prefer to use my improved trays or pans are the filter wash out pipe 17, adapted to supply washing water from the points 18 and 19, upon and under the main filtering medium for cleansing purposes, a chemical tank 20 located in the heater and purifier, with its cold water feed pipe 21, having a strainer 22, a cock 23 by which communication between the pipe 21 and the chemical tank 20 may be cut off when it is desired to drain the tank through the cock controlled pipe 24, and a chemical solution pipe 25.

Having now stated the general features of the apparatus with which I prefer to use my improved trays or pans, though they may be used with any other heater and purifier, I will now proceed to describe the features which enter into my invention.

A main cold water supply pipe 26 enters the apparatus at its top, and has a valve 27 which is automatically opened and closed by a float 28 operating in the upper section or compartment 3, through a rock-shaft 29 mounted in a suitable water-tight bearing in the casing and through a crank 30 and pitman 31. By this means the inflow of the water is intermittent and automatically controlled, the supply being cut off when the maximum level is reached, as determined by the previous adjustment of the float, and being turned on when the water drops materially below that level. This supply pipe 26 is extended into a receiving pan 32 and discharges water therein, as also through the perforations 33 thereon, the water from the perforations mixing with the chemical solution delivered by the perforated nozzle 34 of the solution pipe 25. The object in thus mixing some of the incoming water with this chemical solution is to insure the proper distribution of the latter in and throughout the water to be purified. This solution proceeds from the tank 20 which contains soda ash, or other efficient re-agents, which, by chemical action on the water, collects the impurities, which are subsequently removed by the filter bed. This tank is suitably supported within the heater and purifier and is supplied with water through the pipe 21, this supply being under pressure, so that it passes through the tank, and, becoming heated in that part of the pipe which is within the heater, it dissolves the re-agent, making a solution which, by the pressure of the incoming water effects a discharge of the solution through the pipe 25 and its nozzle 34. The invention involved in this part of the apparatus shown and described herein is embodied in another application filed even date herewith, Ser. No. 332,910, by myself and coinventors O. L. Stump and J. Reidenbaugh, and is only referred to herein for purposes of showing the use of my improved trays or pans in connection therewith. These trays or pans I have arranged in the present illustration in two vertical series, one of four pans and one of three, each series receiving water, intermixed with the chemical solution, from the top of the receiving pan 32 and from the interior thereof through the space 35 between the upper edge of the pan and its top. This space delivers the water in a thin sheet, as does also the top of the receiving pan. This thin sheet of water falls upon the upper pan of each series and, thence running over the convex top, passes over the edges thereof, a part of it dropping down and the greater part trickling along the under side of these upper pans to near the center, and dropping thence to the top of the next pan of each series and flowing thence over its convex surface, thence over its edges, a part dropping down and the larger part trickling along the under surface and repeating the operation above described; and so on through the series of pans.

The pan 32 is of thin sheet metal, as also its top, and is preferably of oblong form, as shown by a comparison of Figs. 1 and 5. This pan rests upon a support 36 suitably secured to the casing. Each of the other pans designated at 37 is of similar oblong form, by preference, as also shown by comparing Figs. 1 and 5. They are made of thin sheet metal and in cross-section are practically elliptical, so as to present a convex top, a convex bottom and slightly rounded sides or edges. They are open at both ends, being mere shells, so that while the water flows thinly over them and trickles along under them, the steam admitted through the inlet 10 and discharged through the outlet 11, being preferably exhaust steam, passes through them, thus highly heating them. Each of these pans has at either end a band composed of strips 38, united at their ends by rivets 39 and supported in the apparatus by lugs or brackets 40 extending out from the casing, as shown particularly in Fig. 5. These bands form ledges which prevent the water from flowing over the ends of the pans and into their interior, so that the water is confined to their exterior, while the steam operates on their interior. These pans afford great radiation for the steam and are, therefore, very effective in bringing the temperature of the water nearly up to that of the steam, causing a rapid precipitation of the impurities, particularly those of a limy quality. Owing to the form of these pans there is little tendency of the lime or impurities to adhere thereto, but all collection or incrustation is prevented by the automatic expansion and contraction of the pans, by the automatic stopping and flowing of the cold feed water through the operation of the valve and float above referred to. When the flow is checked, the pans rapidly increase in heat, and when the flow is renewed, they suddenly cool somewhat, and thus are made to expand and contract, with the result that any adhering incrustation is dislodged. Another advantage arising from this automatic freeing or prevention of incrustation on the pans is that the apparatus need not be stopped for cleaning the pans, so that not only is their efficiency enhanced and maintained, but loss of time in the use of the apparatus is also prevented, because you do not have to discontinue its use to clean the pans. It will further be noted that each of the pans 37 is perforated at the lowest point of its bottom, as shown at 41, to allow the escape of any possible condensed steam. It will also be understood that the pan 32 is closed at its ends, as indicated at 42, so that the overflow therefrom is only at its sides, whereby the water leaving it falls only upon the two series of purifying pans. A baffle plate 43 is secured to the purifier casing, as by lugs and rivets 44, and is located between the exhaust steam outlet and the purifying pans. Its function is to check the draft or passage of steam and to confine it about the pans to make it more effectively heat them. To prevent destroying the current of the steam or confining it too greatly, the baffle plate is perforated, as seen at 45, through which perforations the steam passes sufficiently to keep up the movement of current. A trough 46 at the lower edge of the baffle plate catches any condensation formed on it and delivers it to the compartment below.

It will be seen that by the feature of my elliptical pans with open ends, forming water surfaces on their exterior and steam pockets or receptacles in their interior, with efficient water distribution on their exterior and freedom of steam circulation through their interior, I have provided for a very perfect distribution and heating of the water, and the consequent precipitation of its impurities, while by the feature of the automatic stop and flow of the feed water to the pans thus made, I have provided for their automatic dislodging of any adhering impurities or incrustation.

Having thus fully described my invention, what I claim as new and desire to secure by Letters Patent is:—

1. In a water purifying apparatus, the combination, with a cold water supply pipe and means to automatically stop and permit the flow of water therethrough, of a series of expansible pans, upon which said water is discharged, adapted to expand or contract according to the flow of said water, the pans having exterior water surfaces and interior steam surfaces.

2. In a water purifying apparatus, the combination, with a cold water supply pipe and means to automatically stop and permit the flow of water therethrough, of a series of expansible pans, upon which said water is discharged, adapted to expand or contract according to the flow of said water, the pans having exterior convex water surfaces, and interior steam surfaces, being open to permit the circulation of steam therethrough.

3. In a water purifying apparatus, the combination, with a cold water supply pipe and means to automatically stop and permit the flow of water therethrough, of a series of expansible pans, upon which said water is discharged, adapted to expand or contract according to the flow of said water, the pans being elliptical in cross-section and open at their ends, being placed one above the other, and the lower wall of each pan being perforated, substantially as described.

4. In a water purifying apparatus, a cold water feed pipe, a receiving pan into which it discharges, said pan having a reduced water exit at its edges, a series of pans one above the other, each series located under one of said water exits, and each pan of the series being substantially elliptical and adapted to receive steam in its interior and to distribute water on its exterior.

5. In a water purifying apparatus, a series of purifying pans, each elliptical in cross-section and closed against the admission of water to the interior thereof and each open at its ends for the admission of steam.

6. In a water purifying apparatus, a series of purifying pans, each elliptical in cross-section and each open at its ends for the admission of steam, a ledge or raised surface at the ends of the pans to constitute a water guard and prevent the water from working into the interior of the pans.

7. In a water purifying apparatus, a series of purifying pans, each having convex upper and lower surfaces and adapted to receive steam in its interior, and each having a raised surface at its ends to constitute a water ledge, and a series of supporting devices in the apparatus upon which rest the ledges of the pans.

8. In a water purifying apparatus, a purifying pan substantially elliptical in cross-section and closed against admission of water to the interior thereof to present convex exterior water surfaces, and an interior steam space.

9. In a water purifying apparatus, a purifying pan having exterior water surfaces and an interior steam space and constructed to admit steam thereinto and exclude water therefrom.

10. In a water purifying apparatus, a purifying pan substantially elliptical in cross-section to present exterior water surfaces and an interior steam space, a pan having a water ledge at its ends and perforations near the center of its bottom.

11. In a water purifying apparatus, the combination, with a series of expansible pans adapted to expand and contract under the influence of the water entering said apparatus and having exterior water surfaces and interior steam surfaces, of means intermittently feeding cold water thereto.

12. In a water purifying apparatus, the combination, with a purifier proper having a steam inlet and a steam outlet, of a series of purifying pans located essentially between said inlet and outlet, and a baffle plate located between the pans and the outlet and having perforations to keep up the draft of steam from one outlet to the other.

13. In a water purifying apparatus, the combination, with a purifier proper having a steam inlet and a steam outlet, of a series of purifying pans located essentially between said inlet and said outlet, of a baffle plate located between the pans and the outlet and having perforations and a condensation trough near its lower edge.

In testimony whereof, I affix my signature in presence of two witnesses.

EDWIN D. PACKARD.

Witnesses:
 CARL T. BAUMAN.
 ROBERT G. LUCAS.